United States Patent
Kawakami et al.

(10) Patent No.: US 7,136,217 B2
(45) Date of Patent: Nov. 14, 2006

(54) INTEGRATED OPTICAL ELEMENT

(76) Inventors: Shojiro Kawakami, Atagobashi Mansion Pharaoh C-09, 236, Tsuchitoi, Wakabayashi-ku, Sendai-shi, Miyagi 984-0065 (JP); Takayuki Kawashima, Greyscoat S102, Minami-Koizumi 3-chome, Wakabayashi-ku, Sendai-shi, Miyagi 984-0827 (JP); Wataru Ishikawa, 21-8, Shiomidai-Minami-2-chome, Shichighama-machi, Miyagi-gun, Miyagi 985-0822 (JP); Takashi Sato, Bonari Tomizawa 302, Tomizawa-Minami 1 chome, Taihaku-ku, Sendai-shi, Miyagi 982-0036 (JP)

( * ) Notice: Subject to any disclaimer, the term of this patent is extended or adjusted under 35 U.S.C. 154(b) by 0 days.

(21) Appl. No.: 10/422,156

(22) Filed: Apr. 24, 2003

(65) Prior Publication Data

US 2004/0080808 A1   Apr. 29, 2004

(30) Foreign Application Priority Data

Apr. 25, 2002 (JP) ........................ 2002-163571

(51) Int. Cl.
  *G02F 1/00* (2006.01)

(52) U.S. Cl. ....................... 359/321; 359/322

(58) Field of Classification Search ............... 359/321, 359/248, 245, 250, 237, 238, 332, 586, 587, 359/588, 322, 589, 344; 372/43, 45
See application file for complete search history.

(56) References Cited

U.S. PATENT DOCUMENTS 6,317,554 B1 * 11/2001 Kosaka et al. .............. 385/132
6,582,512 B1 *  6/2003 Geusic et al. ................ 117/3

* cited by examiner

*Primary Examiner*—Hung Xuan Dang
*Assistant Examiner*—Tuyen Tra
(74) *Attorney, Agent, or Firm*—Young & Thompson

(57) ABSTRACT

The optical element includes photonic crystals respectively having different optical characteristics. These photonic crystals are formed in a plurality of regions on a single substrate. The optical element has a structure in which two or more kinds of media are nearly periodically deposited on one-dimensionally periodical grooves. Further, the grooves are different in direction according to locations on the deposited surface. A variety of optical elements each having different dependencies on polarization according to locations can be obtained. That is, portions or zones different in optical characteristics can be integrated on a single substrate.

4 Claims, 6 Drawing Sheets

INTEGRATED OPTICAL ELEMENT

BACKGROUND OF THE INVENTION

1. Field of the Invention

The present invention relates to an integrated optical element with a plurality of regions that differ in optical characteristic according to locations, wherein said regions each are of a structure with a two-dimensional or three-dimensional periodicity in refractive index and are combined together so that the periodicities in refractive index of said regions are different in direction from each other, and a method for making the same.

2. Description of the Related Art

Optical materials that have been used up to now are materials existing in the natural world, and they are classified into amorphous materials and crystalline materials. An amorphous material has no dependency on direction in optical characteristic. A crystalline material is anisotropic in relation between its crystal axes and the traveling direction or polarization direction of light. However, such a direction is specifically determined in a crystalline material of one kind. Therefore, in case of either amorphous materials or crystalline materials, realizing different optical characteristics in a single optical element has only been possible by combining different materials with one another by means of an adhesive agent and the like.

Since the present invention covers a very wide range of applications related to an optical element, a polarizer is taken as an example of them. Polarizers in use at present in order to obtain a specific polarization state can be classified on the basis of their action manners into (1) a polarizer to absorb unnecessary polarized waves and (2) a polarizer to separate polarized waves into separate optical paths.

A polymer film containing dichroic molecules such as iodine and the like is common as a polarizer performing the action of item (1) described above. This provides an inexpensive and large-area polarizer but has a disadvantage of being low in extinction ratio and inferior in temperature characteristic.

In order to solve this problem, a polarizer using a material that is high in stability has been developed. That is to say, this is formed by arranging an absorber such as metal, semiconductor or the like in the shape of fine lines or thin films in one direction inside a transparent body of glass or the like. A polarized wave component parallel with fine lines or thin films is absorbed or reflected and a polarized wave component perpendicular to them is transmitted.

Since a drawing process is used for any one of the above-mentioned polarizers, it is impossible to make a transmitted polarized light have the dependency on location. Therefore, in order to make it have the dependency on location, it is necessary to stick together a plurality of sheets of materials that are different in polarization direction of transmitting.

On the other hand, for a polarizer using doubly refracting crystal as a polarizer of item (2), a material large in double refractive index such as calcite and the like is used. A structure formed by sticking two triangular prisms together or a wedge-shaped structure is used, and thereby divides polarized lights into different optical paths. Since they each use a natural crystal, its crystal axes are specifically determined and it is impossible to realize crystal axes with different directions at optional locations in a single crystal. Therefore, in case of attempting to make different polarized lights pass through different regions, it is necessary to combine crystals with crystal axes of different directions.

As a polarizer using Brewster's angle of a transparent body, there is mentioned a polarization beam splitter using a dielectric multilayer film. This has a dielectric multilayer film located obliquely to the incident direction of light. Therefore, in case of attempting to make its polarization characteristic have the dependency on location, it is necessary to arrange a plurality of multilayer films in different directions, and it is apparent that this cannot be realized by means of a single element.

Another example is a wave plate. A wave plate generally in use utilizes the double refractivity of a crystallized quartz plate. Therefore, the material itself is expensive and a high-accuracy thickness control is required for making a wave plate act as a ¼-wavelength plate or a ½-wavelength plate. Further, making the optical characteristic of a single element have the dependency on location can only be realized by arranging a plurality of wave plates.

Thus, an object of the present invention is to solve the above-mentioned problems, realize a structure with an optional optical characteristic at an optional location in it and thereby realize an optical element with a high functionality not obtained from the natural world.

SUMMARY OF THE INVENTION

A crystal with a two-dimensional or three-dimensional periodicity in refractive index the period of which is on the order of wavelength is called a photonic crystal, and its optical characteristics depend on the refractive index of its material, the period of its structure, its periodical arrangement and its direction of periodicity of it. As an example of realized optical characteristics, a phenomenon occurs that light is cut off in a specific wavelength band due to Bragg cutoff caused by a fact that light is multiply reflected at the respective periods. And even if a cutoff phenomenon does not occur, since the degree of multiple-reflection varies according to wavelength, its effective refractive index is changed and thereby wavelength dispersion can be provided. Further such optical characteristics have the dependency on polarization and can also realize a double refractivity.

A great feature of a photonic crystal is in that since it has an artificial structure its optical characteristics can be controlled by the design of its structure. Therefore, it is possible to realize a specific optical characteristic at a specific location.

Figure 1:
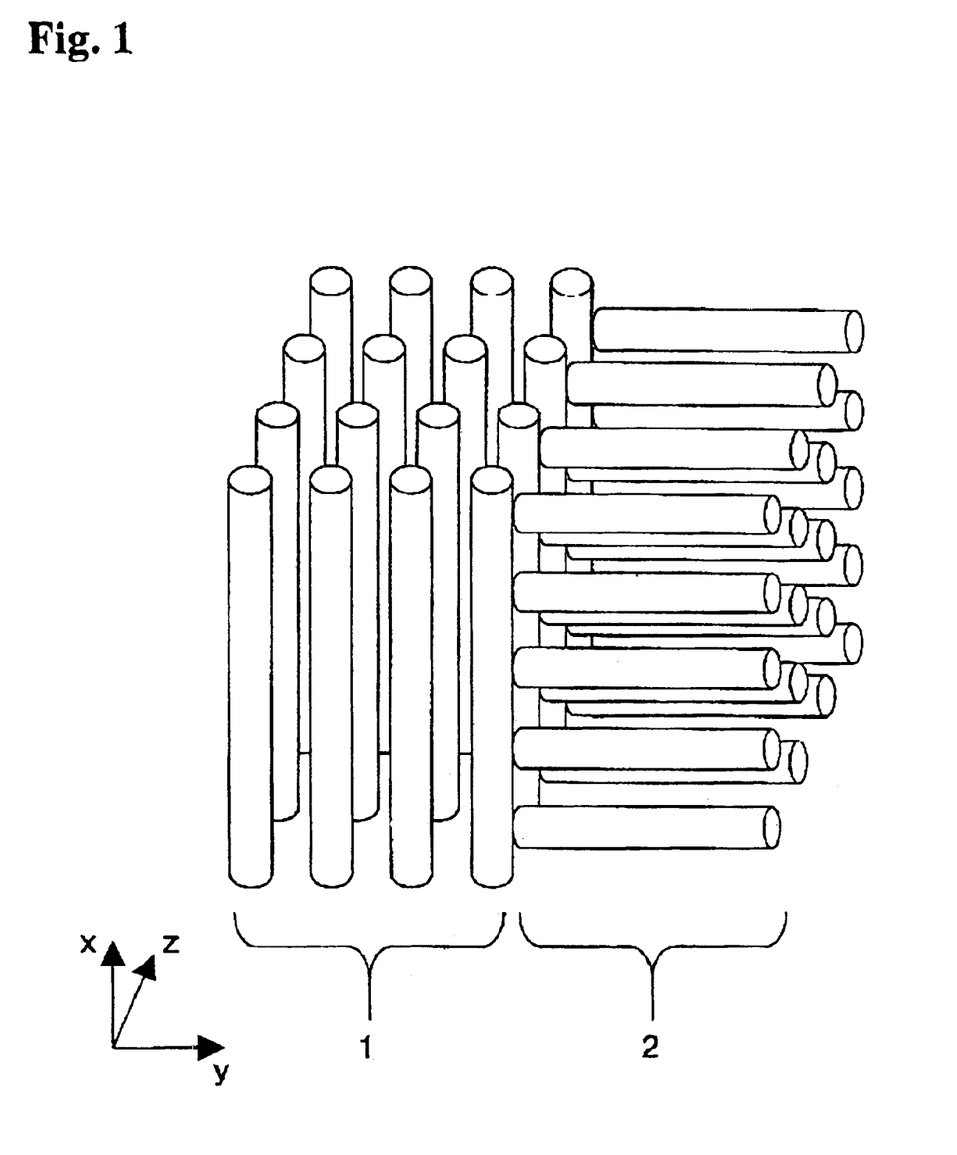
FIG. 1 is a conceptual figure of a structure in which anisotropic two-dimensional photonic crystals are combined together in different directions.

For example, a polarizing element is discussed. A structure obtained by combining two two-dimensionally periodical structures as shown in FIG. 1 is considered.

In such an artificial periodical structure composed of a high refractive index medium and a low refractive index medium, two polarized wave components perpendicular to each other have respective dispersion relations (each of which is the relation between frequency and wave vector) independent of each other. In FIG. 1, when light progresses in the z direction, a polarized wave component parallel with columns and a polarized wave component perpendicular to the columns have different band gaps or different wavelength ranges in which light is cut off. That is, in a certain wavelength range, it may occur that one polarization mode light is cut off and the other polarization mode light is propagated. That is to say, in this wavelength range, this periodical structure can operate as a polarizer that reflects or diffracts one polarized light and transmits the other polarized light. And this provides a polarizer being theoretically sufficiently high in extinction ratio ("Possibility of a Polarizer Using a Two-Dimensional Photonic Crystal" by Tetsuko Hamano, Masayuki Izutsu and Hideki Hirayama, 58th Applied Physics Fall Collection of Papers, paper 2a-W-7, 1997, and "Optical Anisotropic Multilayer Film By Structural Double Refraction" by Akira Sato and Masahiro Takebe, Optics Japan'97, Collection of Papers, paper 30pDO1, 1997).

A structure designated by symbol 2 can realize a characteristic that reflects a polarized light of the x direction and transmits a polarized light of the y direction reversely to a structure designated by symbol 1, by making a structure obtained by turning the structure of symbol 1 by 90 degrees in the x-y plane.

According to a required function, characteristics of transmission and reflection can be redesigned, and the angle between the structure of symbol 1 and the structure of symbol 2 does not have to be 90 degrees, and a plurality of regions different in angle may exist and the respective structures may be different in period from one another.

Additionally, it is possible to provide the cutoff characteristic and the dispersiveness with not only the dependency on polarization but also the dependency on location. Thus, it is possible to realize an optional optical characteristic at an optional location by using a photonic crystal.

An example of a method for realizing a photonic crystal is the self-cloning method (Japanese Patent Laid-Open Publication No.Hei 10-335,758). This is a method for performing a layer deposition while keeping a corrugated shape reflecting the pattern of a substrate by depositing an alternate multilayer film on the substrate with a corrugated pattern formed on it by the use of a film forming method using both diffuse incidence and sputter etching of deposited particles represented by the bias sputtering method. This mechanism can be explained as superposition of the following three effects at a proper ratio: (1) an effect that the deposition rate of particles in a depression shaded due to dispersion incidence is reduced, (2) an effect that the etching rate by a sputter etching process of a face inclined at an angle of about 50 to 60 degrees is maximum, and (3) an effect that particles shaved off by a sputter etching process stick again to another location on a substrate ("Mechanism of Forming a Three-Dimensionally Periodical Nano-Structure Made by the Bias Sputtering Method" by Shojiro Kawakami, Hisashi Sato and Takayuki Kawashima, Journal of Institute of Electronics, Information and Communication Engineers C-1, Vol. J81-C-1, No.2, pp.108–109, February, 1998).

In a self-cloning method, since a corrugated pattern on a substrate is formed by lithography and etching, an optional pattern that differs according to locations can be formed and a photonic crystal formed on it reflects the pattern and thereby a photonic crystal that differs according to locations is realized.

Further, a polarizer with a high performance has been realized in a two-dimensionally periodical structure made by the self-cloning method (Japanese Patent Laid-Open Publication No.2000-56,133).

Figure 2:
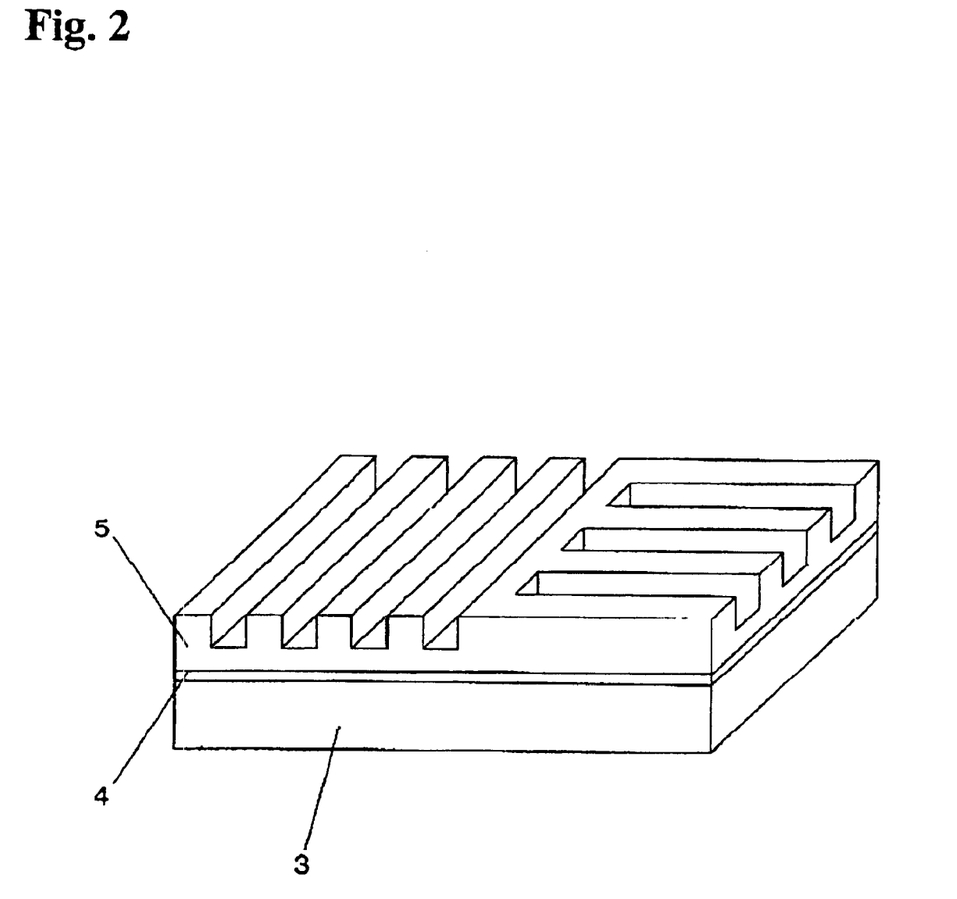
FIG. 2 shows a substrate with grooves on a surface of embodiment 1.
Figure 3:
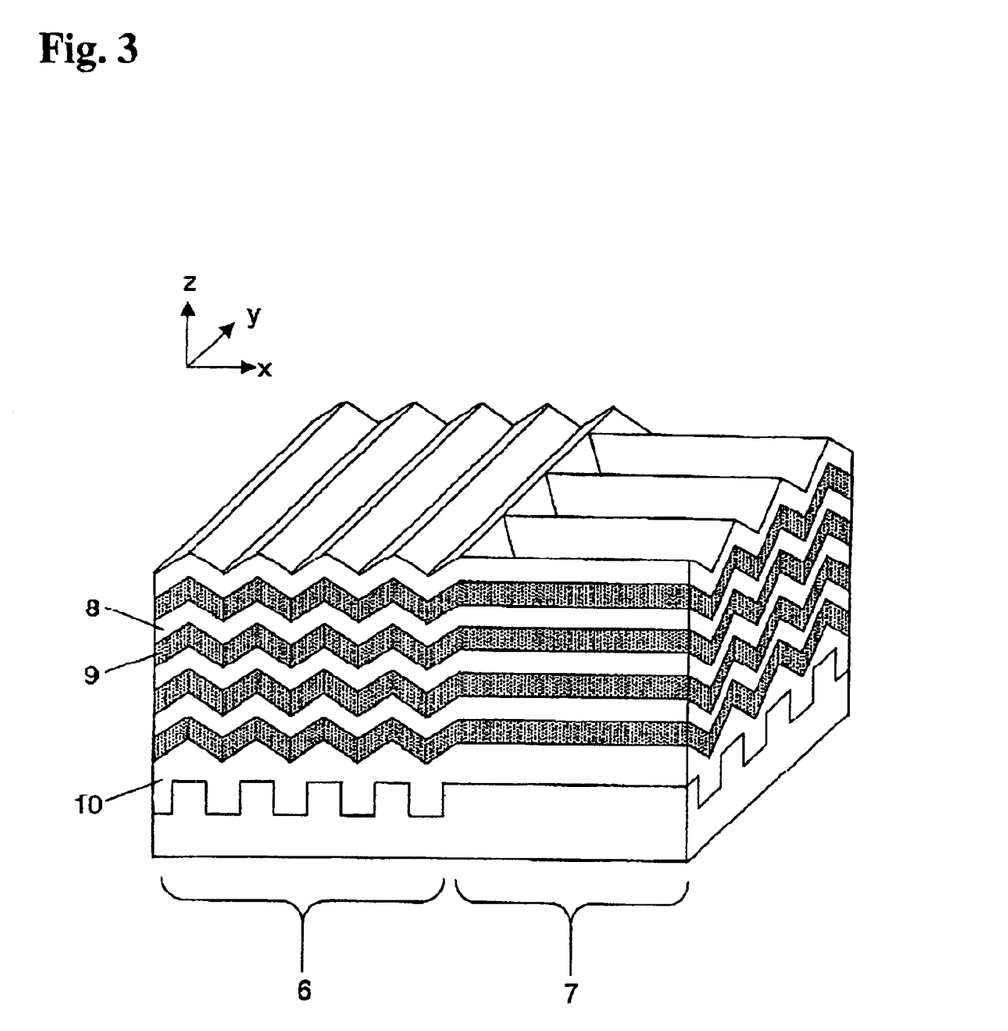
FIG. 3 shows a structure made by the self-cloning method in embodiment 1.

A structure as shown in FIG. 3 can be realized by providing a substrate as shown in FIG. 2 and depositing a multilayer film on the substrate by means of the self-cloning method. Such a structure can make the portion of symbol 6 and the portion of symbol 7 have different dependencies on polarization in a manner similar to FIG. 1.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate at least one preferred embodiment of the invention, in one form, and such exemplifications are not to be construed as limiting the scope of the invention in any manner.

DESCRIPTION OF THE SYMBOLS

1: Two-dimensional photonic crystal with a structure that is uniform in the x direction
2: Two-dimensional photonic crystal with a structure that is uniform in the y direction
3: Substrate
4: Reflection-free coating layer
5: Periodical grooves
6: Two-dimensional photonic crystal with a structure that is uniform in the y direction, made by means of the self-cloning method
7: Two-dimensional photonic crystal with a structure that is uniform in the x direction, made by means of the self-cloning method
8: $SiO_2$ layer
9: Si layer
10: Substrate forming layer
11: One of frequency bands in which a polarizer of embodiment 1 acts as a polarizer transmitting TM wave
12: One of frequency bands in which the polarizer acts as a polarizer transmitting TM polarized wave
13: One of frequency bands in which the polarizer acts as a polarizer transmitting TE polarized wave
14: Two-dimensional photonic crystal with a structure that is uniform in the x direction
15: Two-dimensional photonic crystal with a structure that is uniform in the y direction

DETAILED DESCRIPTION OF THE PREFERRED EMBODIMENTS (Embodiment 1)

A polarizing element of the portion designated by symbol 3 in FIG. 3 is described. In the figure, symbol 8 is an amorphous $SiO_2$ layer ($SiO_2$ layer) and symbol 9 is an amorphous Si layer (Si layer). The period Lx in the x-axis direction is 0.5 μm and the period Lz in the z-axis direction is 0.57 μm. The $SiO_2$ layer 8 and the Si layer 9 each have a zigzag shape along the x-axis direction. Symbol 7 shows a structure obtained by turning a structure of symbol 6 by 90 degrees.

Next, a method for making this structure is described.

First, a periodical resist pattern is formed on a substrate by means of an electron beam lithography technique. The width of the groove is 0.25 μm, the depth is 0.2 μm and the period in the transverse direction is 0.57 μm. FIG. 2 shows a schematic figure of it. Symbol 3 is a substrate, symbol 4 is a reflection-free coating layer, and symbol 5 is a periodical groove portion. Generally, according to selection of the dimensions of a periodical structure, portions 4 and 5 are selected from materials different from the substrate, but grooves can also be formed on the same material as the substrate. In this case, $SiO_2$ and Si targets were used on a quartz substrate, and $SiO_2$ and Si layers were alternately deposited by the bias sputtering method. At this time, it is important to perform deposition while preserving the shape of each layer periodically depressed and protruded in the x-axis direction. The condition for this was as follows. In case of deposition of a $SiO_2$ film, the pressure of Ar gas was 2 Pa, target high-frequency power was 800 W and substrate high-frequency power was 20 W; and in case of deposition of a Si film, the pressure of Ar gas was 0.15 Pa and target high-frequency power was 400 W. Ten $SiO_2$ layers and ten Si layers were deposited alternately layer by layer. The total thickness of the resulting deposited layers was about 6 μm.

In order to prevent the reflection caused by the difference in refractive index between periodical grooves and a multilayer film on a substrate and between the multilayer film and air, the multilayer film and the substrate or the air were matched by inserting films adjusted in thickness over and under the multilayer film of every ten layers and thereby the reflection was reduced. In this case it was assumed that there was air over the multilayer film, but there can be a different substance other than air.

Figure 4:
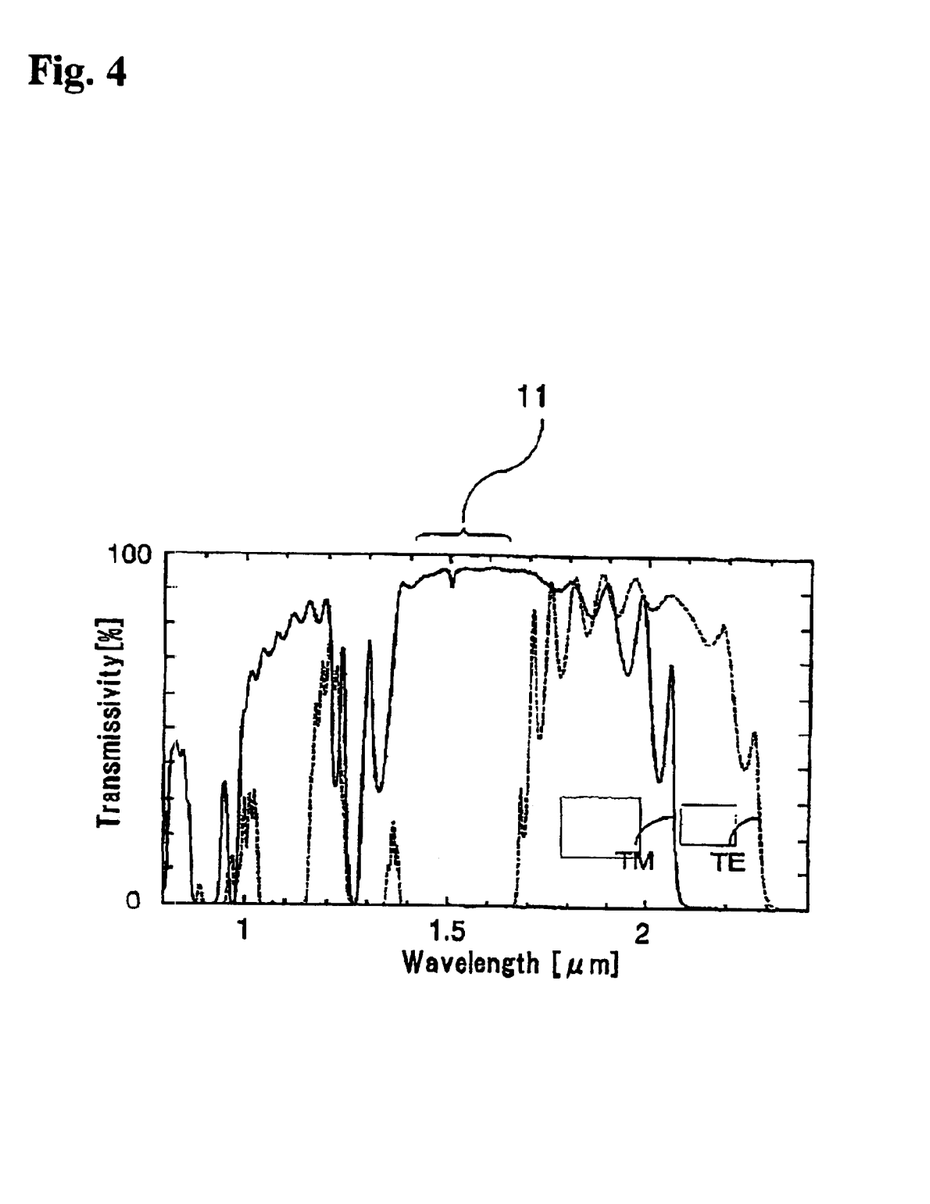
FIG. 4 shows the relation between wavelength and transmissivity in embodiment 1.

FIG. 4 shows the result of measuring the transmissivity of a made structure for each polarized wave in case of inputting light perpendicularly to the structure while changing the light in wavelength. Here, a polarized wave parallel with the grooves is denoted as a TE wave and a polarized wave perpendicular to the grooves is denoted as a TM wave. The TM wave is transmitted in the vicinity of 1.5 μm of wavelength shown by symbol 11, while the TE wave is cut off. The cut-off TE wave is reflected as a reflected light. And as a result of introducing reflection-free layers into a part where the deposition is started and a part where the deposition is ended, the transmissivity of the TM wave shows a high value in the vicinity of 1.5 μm of wavelength. Further, the transmissivity is not fluctuated with the change in wavelength but provides a flat characteristic due to multiple reflections generated in the interfaces between the multi-player film and the substrate and between the multilayer film and air.

Figure 5:
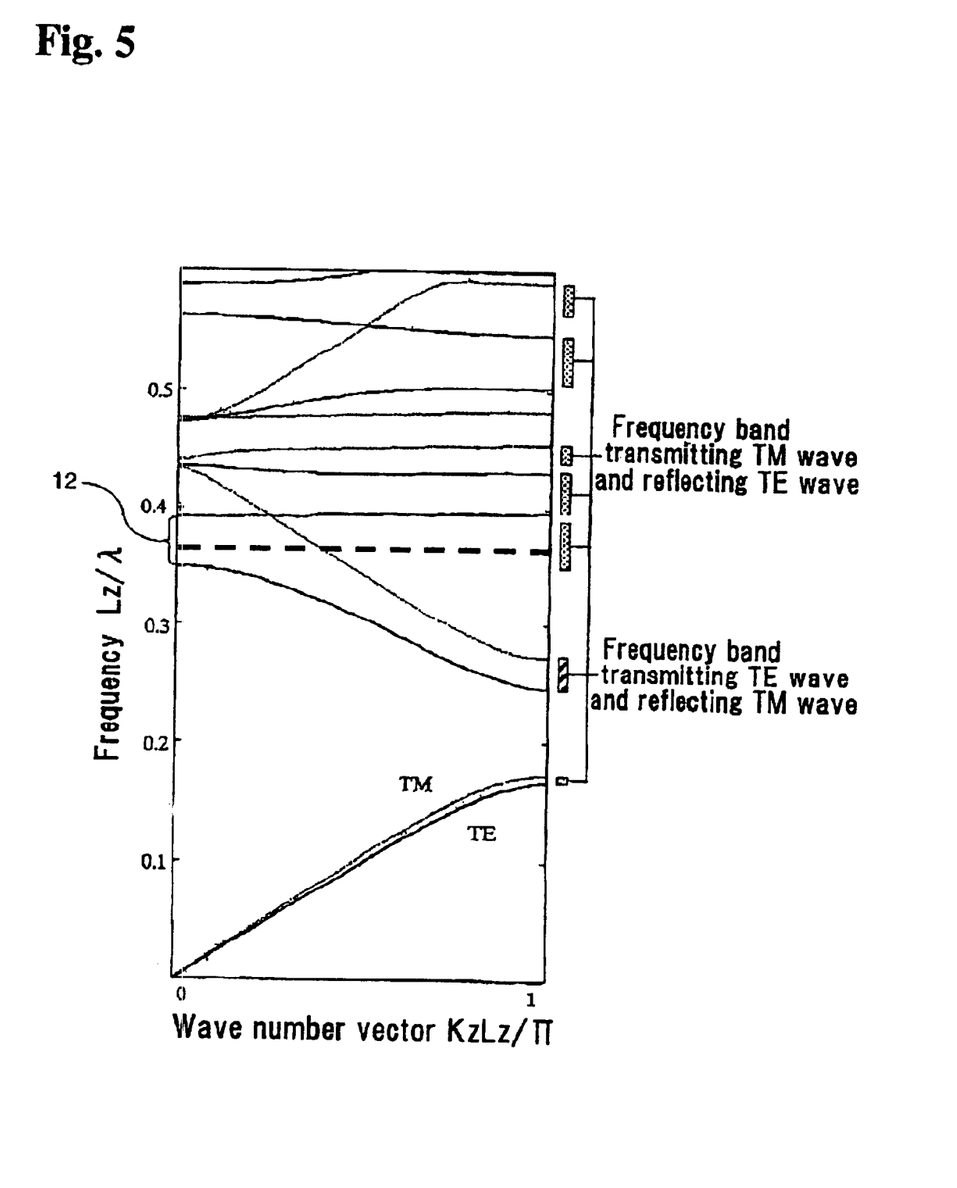
FIG. 5 shows the relation between frequency and wave vector in embodiment 1.

FIG. 5 shows the result of computing the relation between frequency and wave vector in this periodical structure by means of the FDTD method (finite difference time domain method) using a periodical boundary condition. The analysis of the band structure and light transmitting characteristic of a photonic crystal by means of the FDTD method is as reported by S. Fan et al. in Physical Review B, vol. 54, no. 16, pp. 11245–11251 (1996).

In FIG. 5, the abscissa shows frequency $L_x/\lambda$ represented by a relative value. Here, λ is the wavelength of an incident light, and $k_z$ is the z component of a wave vector. A solid line and a dashed line show dispersion curves in TE and TM waves respectively. Here, frequency $L_x/\lambda=0.371$ is obtained from $L_x=0.5$ μm and wavelength=1.55 μm. As known from this figure, a straight line of $L_z/\lambda=0.371$ does not cross the dispersion curve of TE wave (solid line) but crosses the dispersion curve of TM wave (dashed line). This means that the TE wave is cut off while the TM wave is transmitted. That is to say, this periodical structure acts as a polarizer that transmits TM waves in a frequency band of symbol 12 where frequency $L_z/\lambda$ is in a range from 0.35 to 0.39.

A material with $SiO_2$ as the principal ingredient is the most common as a low-refractive index medium. $SiO_2$ has a wide transparent wavelength range and is also stable chemically, thermally and mechanically, and is easy to perform deposition. An oxide such as $TiO_2$ and the like or a semiconductor such as Si, GaAs and the like can be used as a high-refractive index material. $TiO_2$ has a wide transparent wavelength range and can also be used in the range of visible light. On the other hand, the semiconductor is limited to the near infrared range but is large in refractive index and has an advantage of being wide in operating band as a polarizer.

By the way, it is desirable that a multiple-purpose polarizer can be used in a wide frequency band. By properly determining a high-refractive index medium layer and a low-refractive index medium layer in shape, it is possible to widen a frequency band to be used for a polarizer. Contrarily, for a monochrome light such as a specific laser light, the shapes of a high-refractive index medium layer and a low-refractive index medium layer are large in degree of freedom and can select a shape easy to repeat in deposition can be selected.

The ratio of the period of repetition in the z-axis direction to the period of repetition in the x-axis direction $L_z/L_x$ was 1.14 in the embodiment, but from another result of computation by the FDTD method it is known that even the ratio of about 0.2 enables the action as a polarizer. The period in the x direction Lx is selected to be not larger than the wavelength of light in case that it is used as an ordinary polarizer. However, in a polarizing element for straightly transmitting one polarized light and diffracting the other polarized light, it is known that it is preferable to select period $L_x$ being longer than the wavelength of light. Further, from another result of computation it is known that the grooves do not necessarily need to be uniform in the y-axis direction but may have a periodical structure different in width and interval from the grooves in the x-axis direction or may be grooves being long enough in the y direction and long at random.

By the way, although this embodiment uses the bias sputtering method as a means for performing deposition as repeating the shape of a layer to be a unit, it is possible to enlarge the degree of freedom of designing the shape of a layer to be a unit of deposition by additionally using a method of performing a deposition process and a sputtering etching process separately in time rather than simultaneously. Moreover, it is possible to use optical glass such as Pyrex and the like additionally to amorphous $SiO_2$ as a low-refractive index medium. On the other hand, it is possible also to use $TiO_2$, $Ta_2O_5$, $Nb_2O_5$ and the like additionally to Si as a high-refractive index medium. It is apparent to be able to obtain a similar effect by combining materials being different in refractive index in addition to these materials.

Symbol 10 is a film deposited with a material that is the same in refractive index as the periodical grooves for the first several periods. The refractive index can be controlled to have an optional value between the refractive index 1.46 of $SiO_2$ and the refractive index 3.5 of Si by performing a reactive sputtering process using a gas with argon and oxygen mixed at some ratio when sputtering Si target. By depositing several layers to be made in such a way, it is possible to settle a multilayer film into a shape to be preserved in deposition in case that a substrate is in any shape. And since the refractive index is not different for light, it is not possible to feel the difference between the periodical grooves and the first several layers.

Although an electron beam lithography technique and a dry etching technique were used in order to form the periodical grooves of the substrate, an optical lithography technique or an X-ray lithography technique may be used, and the shape of the pattern does not need to be rectangular in shape but may be periodically depressed and protruded. And without using a lithography technique, it is also possible to form periodical grooves on a substrate of silicon or the like in advance and press it as a metal mold to a substrate coated with a polymer material such as polyimide or the like and thereby form a pattern. Thereafter, the pattern is transferred to a crystal plate by means of a dry etching technique. Since the grooves to be formed in the crystal plate do not need to be rectangular, a wet etching process can be used as the etching process for transferring a pattern.

(Embodiment 2)

In a similar structure to the portion of symbol 3 in FIG. 3, by properly determining the period of the pattern on a substrate and the period of deposition, it is possible to make the structure act as a wave plate providing an optional phase difference between polarized lights being perpendicular to each other. That is, a structure as shown in FIG. 3 provides an optical element with wave plates whose optical axes are directed in different directions according to locations, combined together. Further, since a structure with the same period of deposition can be made to act as a ½-wavelength plate or a ¼-wavelength plate by changing the period of the pattern of a substrate, it is possible to realize a ½-wavelength plate and a ¼-wavelength plate at the same time on a single substrate by making the period of the substrate different according to locations.

As application of such a device, there is an optical circulator (Japanese Patent Laid-Open Publication No.Hei 10-239,638 or Japanese Patent Laid-Open Publication No.Hei 11-194,301). Ordinarily, an optical circulator divides an optical path into two optical paths according to different polarized lights, and thereafter needs wave plates being different in optical axis in the respective optical paths. Thereupon, up to now, two wave plates have been provided separately and fixed adjacently to each other.

Since the present invention makes it possible to make wave plates with an optional optical characteristic at an optional location on a single substrate, it is possible to realize a product with high mass-productivity, as said product does not need a sticking process and the wave plates do not slip from each other in parallelism.

(Embodiment 3)

Figure 6:
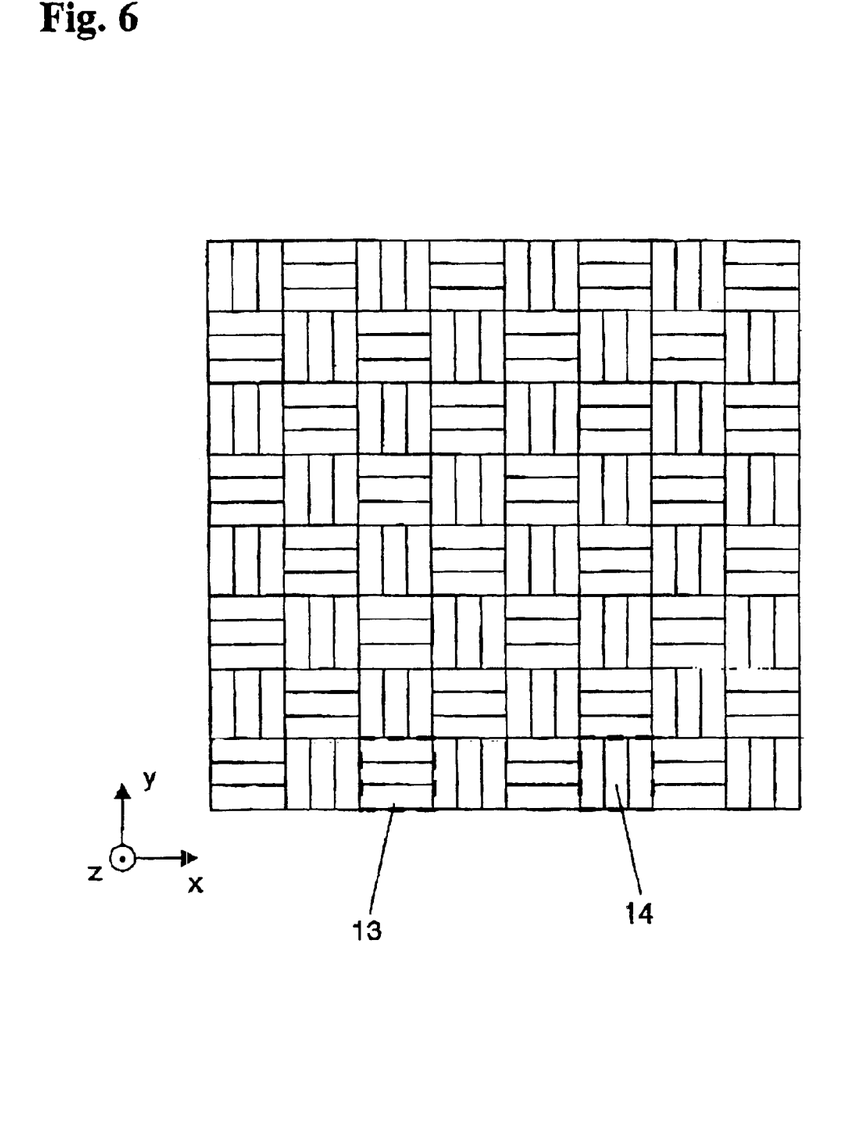
FIG. 6 shows an arrangement of half-mirror structures with no dependency on polarization in embodiment 3, viewed from a direction perpendicular to the substrate.

Regions that are different by 90 degrees in direction of grooves from each other are alternately arranged two-dimensionally like a pattern shown in FIG. 6. In such a structure, assuming that the structures in symbol 13 and symbol 14 are similar to those of symbols 6 and 7, the portion of symbol 13 reflects a polarized light in the x direction and transmits a polarized light in the y direction. On the other hand, the portion of symbol 14 transmits a polarized light in the x direction and reflects a polarized light in the y direction. By making the region of symbol 13 and the region of symbol 14 equal in area to each other, any polarized light of an incident light in the z direction is reflected by one of regions of symbols 13 and 14 and is transmitted by the other. That is, an optical element can be produced in which 50% of incident power is reflected and the other 50% of it is transmitted regardless of the polarized state of the incident. This action is possible in a range of wavelength shown by symbol 11 of FIG. 4, and this optical element can operate in a range of ± several degrees in angle of incidence. Thus, by using the present invention, it is possible to realize a half mirror that has a high degree of freedom of angle of incidence and depends on no polarized light.

And also by arranging structures different in direction by 90 degrees from each other not periodically but at random, a similar effect can be expected if each one of these structures is smaller in size in comparison with the diameter of a light beam.

Further, by adjusting the ratio in area between the respective regions, it is possible to take out a light containing the respective polarized light components at an optional ratio.

According to one form of the invention, there is provided a periodic optical structure having a plurality of portions each having an area larger in comparison with a period of the structure. Additionally, in another form, there is provided an article and a method of making such article, which employs a periodical structure having a substrate and a plurality of periodically corrugated portions formed on at least one surface of the substrate, where each corrugated portion is larger in area than a period of corrugation.

EFFECT OF THE INVENTION

Since a conventional optical element utilizes the optical constants of substance as they are, it cannot make only an optional portion have a function. However, by using a photonic crystal that is an artificial structure, it is possible to make an optional portion have an optional optical constant.

For example, it is possible to form a photonic crystal with the dependency on polarization in characteristic at only a desired portion, and further it is possible to form regions with different dependencies on polarization in an optional arrangement. This makes it possible to realize a function (which has been able to be realized only by joining different elements together through a process of adhesion or the like in the prior art, by means of a single element, and reduce the cost of materials and greatly reduce the process of manufacturing. Furthermore, since it is possible to make a specific portion have a function with a complicated pattern, it is possible to realize an element with a complicated function that has been unable to be realized by the prior art.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An optical element, comprising:
   a single substrate;
   at least two kinds of dielectrics, said kinds of dielectrics differing in refractive index relative to each other, said dielectrics being formed on said single substrate to thereby establish an optical structure, said optical structure having at least one of a two-dimensional periodicity and a three-dimensional periodicity, said optical structure having a plurality of portions each having an area larger in comparison with a period of said structure, said plurality of portions being greatly different from each other in a direction of and the periodicity in a corresponding said portion, said optical structure thereby being operable for having respective said portions having different optical characteristics relative to one another in an instance wherein light is incident substantially perpendicularly onto said substrate.

2. An optical element according to claim 1, wherein said portions each are a two-dimensionally periodical structure having the periodicity in one of a first direction perpendicular to said substrate and a direction perpendicular to said first direction, the respective directions having no periodicity being directed to different directions from each other, the respective portions each having a dependency on polarization with respect to a particular said optical characteristic in relation to a polarized wave parallel with the direction having no periodicity and a polarized wave perpendicular thereto.

3. An optical element according to claim 1, wherein said portions each are a two-dimensionally periodical structure having the periodicity in one of a first direction perpendicular to the substrate and a second direction perpendicular to said first direction, said structures being different in direction of periodicity by 90 degrees from each other and being smaller in size in comparison with the diameter of an incident light beam, said structures being alternately formed two-dimensionally to thereby make it possible for the optical characteristics of the structures to have a dependency on polarization at an optional ratio when light is incident nearly perpendicularly onto said substrate.

4. A method for making a multi-dimensionally periodical structure by laminating at least two kinds of materials sequentially and nearly periodically on a substrate having one or two dimensionally nearly periodically recessed and projecting portions, and sputter etching employed separately from or simultaneously with film deposition at least said a part of said lamination, comprising a step of forming a plurality of periodically corrugated portions each being larger in area than a period of corrugation on at least one surface of a substrate of the structure, a step of making at least one of the periods or a corresponding direction of each of the periods of said corrugated portions greatly different from each other according to particular locations, and a step of applying said self-cloning method to at least a part of the pattern made by said two steps.

* * * * *